United States Patent [19]

Strutzel et al.

[11] Patent Number: 4,886,634
[45] Date of Patent: Dec. 12, 1989

[54] PROCESS AND APPARATUS FOR THE PRODUCTION OF AN EXTRUDED, STRETCHED, SEAMLESS TUBE

[75] Inventors: Hans Strutzel; Peter Wink, both of Wiesbaden, Fed. Rep. of Germany

[73] Assignee: Hoechst Aktiengesellschaft, Frankfurt am Main, Fed. Rep. of Germany

[21] Appl. No.: 236,912

[22] Filed: Aug. 26, 1988

[30] Foreign Application Priority Data

Sep. 3, 1987 [DE] Fed. Rep. of Germany ....... 3729449

[51] Int. Cl.$^4$ .............................................. B29C 47/90
[52] U.S. Cl. .................................... 264/560; 264/568; 264/209.4; 264/209.5; 264/289.3; 425/71; 425/326.1; 425/388
[58] Field of Search ... 264/568, 566, 565, 209.3–209.5, 264/210.2, 560, 557, 289.3, 559; 435/326.1, 327, 388, 380, 392

[56] References Cited

U.S. PATENT DOCUMENTS

| | | | |
|---|---|---|---|
| 3,218,380 | 11/1965 | Euling et al. | 264/209.5 |
| 3,274,314 | 9/1966 | Hudson et al. | 264/568 |
| 3,313,870 | 4/1967 | Yazawa | 264/209.5 |
| 3,315,308 | 4/1967 | Wiley et al. | 425/326.1 |
| 3,427,375 | 2/1969 | Turner | 425/326.1 |
| 3,796,781 | 3/1974 | Edwards et al. | 264/89 |
| 3,804,574 | 4/1974 | Gatto | 425/388 |
| 3,857,917 | 12/1974 | Reade | 264/560 |
| 4,159,889 | 7/1979 | Yagi et al. | 425/326.1 |
| 4,294,796 | 10/1981 | Jack et al. | 264/560 |
| 4,443,399 | 4/1984 | Takashige et al. | 425/326.1 |

FOREIGN PATENT DOCUMENTS 1059346 2/1967 United Kingdom .
1106994 3/1968 United Kingdom .

*Primary Examiner*—Jeffery Thurlow
*Attorney, Agent, or Firm*—Foley & Lardner, Schwartz, Jeffery, Schwaab, Mack, Blumenthal & Evans

[57] ABSTRACT

A seamless parison extruded from an extruder via an annular die, passes through a calibrator and coaxially surrounds a probe pipe, which is made to extend through the annular die beyond the calibrator. On the probe pipe there is mounted a sealing element. Ahead of the sealing element, a pressure equal to atmospheric pressure prevails inside the tube and, after the sealing element, a higher pressure than atmospheric pressure prevails. The pressurization is achieved in that a second belt take-off folds together the tube, so that the compressed air fed in through the probe pipe causes a higher tube internal pressure, since the sealing element bears in a sealing manner against the inside of the tube. As a result, a substantial pressure separation is effected at the point of the sealing element. In a first heating chamber, the tube is heated to the stretching temperature and is transported by a second belt take-off at a stretching speed, increased relative to the take-off speed of the first belt take-off, to a second heating chamber, in which a heat setting of the tube takes place. From the heating chamber, the tube is transported onward at the same, greater or lower speed than the stretching speed by a third belt take-off and wound up by a deflection roller onto a wind-up roller.

20 Claims, 6 Drawing Sheets

PROCESS AND APPARATUS FOR THE PRODUCTION OF AN EXTRUDED, STRETCHED, SEAMLESS TUBE

BACKGROUND OF THE INVENTION

The present invention relates to a process and an apparatus for the production of an extruded, stretched, seamless tube from partially crystalline polymers, which is continuously calibrated on the outside in one operation.

A process for the production of a parison, in which an outer calibration of the parison takes place in a vacuum, is known from U.S. Patent Specification No. 3,804,574. Outer calibration displays advantages over inner calibration, in particular for tube diameters of less than 70 mm. Due to a relatively small transverse stretching ratio of $\lambda_Q = 3.4$, the linkages belonging to a mandrel of less than 24 mm diameter can no longer be accommodated (in the case of inner calibration) in a torpedo bore of a die of less than 24 mm diameter. Since the linkage must include a stretching-air supply line, a water feed, a water return and a purging-air supply line, it is obvious that the linkage diameter cannot be reduced to a diameter of less than 24 mm.

An apparatus for the production of an extruded tube from isotactic polypropylene with a calibrating device which is arranged on the extrusion head of an extruder inside the tube and consists of plates arranged perpendicular to the tube axis, is known from German Patent Specification No. 1,242,851. A tubular casing encloses the tube and is arranged in a cooling bath underneath the surface of the cooling liquid. Cooling liquid flows over the upper rim of the casing onto the outer surface of the tube. In the lower region, the casing is sealed off against the admission of cooling liquid and has a connection which is connected to a suction pump delivering the cooling liquid into the storage tank. Through the calibrating die there leads a compressed-air supply line for regulating the volume of the tube in the piece between the calibrating die and rolls which fold up the tube inside the collecting tank and deflect it upward for exiting the collecting tank. With this apparatus, an inner calibration of the tube takes place.

The apparatus described in German Auslegungsschrift 1,504,050 for the production of biaxially-oriented thermoplastic films in the blow-molding process likewise has an inner calibrating device of one or more plates, which bound a cooling zone containing a cooling medium, which is closed off at the opposite end by a seal. The mandrel protruding from the extrusion die into the tube contains three mutually coaxial pipes for the supply and discharge of cooling liquid into the cooling zone and the air supply into the tube underneath the seal.

In German Offenlegungsschrift No. 2,136,168, a process and an apparatus for the production of a continuously extruded tube are described, the tube being led from an extrusion die of an extruder vertically downward into a quenching bath, while the inside of the tube is cooled by a cooling liquid which is circulated in the tube. The inner calibration takes place by means of a plurality of calibrating plates, which are arranged coaxially to one another and perpendicular to the axis of the tube. The pressure of a gas, which is introduced via a line into the tube above the calibrating plates, is regulated with the aid of valves. The tube runs vertically downward via the calibrating plates to a pair of pinch rolls, which smooths the tube over part of its width. Then the tube is deflected upward out of the quenching bath and subsequently wound up or subjected to further processing.

SUMMARY OF THE INVENTION

It is an object of the present invention to create a process and an apparatus for producing a stretched tube from partially crystalline polymers which make possible a continuous tube stretching of a tube calibrated on the outside.

In accomplishing these and other objects, there is provided a process for the production of a stretched, seamless tube from a partially crystalline polymer, which is continuously calibrated on the outside in one operation, comprising the steps of feeding an annular parison into a calibrator having a vacuum zone, producing a calibrated tube from the parison by means of vacuum calibration in which a pressure $p_{i1}$ equal to atmospheric pressure $p_{atm}$ prevails inside the tube and a negative pressure $p_{a1}$ lower than atmospheric pressure prevails on the outside of the tube in the vacuum zone, transporting the tube at a speed $V_1$ from the calibrator, separating the pressures inside the tube at the beginning of the stretching step by subjecting the inside of the tube downstream from the calibrator to a pressure $p_{i2}$ greater than atmospheric pressure, heating the tube in a heating zone to a stretching temperature $T_{ST}$, and transporting the tube at a speed $V_2$ from the heating zone, wherein $V_2 > V_1$, so that the tube is stretched.

The apparatus for carrying out the process comprises an apparatus for the production of an extruded, stretched, seamless tube from a partially crystalline polymer, which is continuously calibrated on the outside in one operation, comprising an annular die for producing a parison, a calibrator and vacuum tank arranged after the annular die for producing a tube from the parison by vacuum calibration, a probe with gas-flowing means running through the calibrator and vacuum tank almost up to a first tube-advancing means, a sealing element on a portion of the probe pipe after the calibrator so that different pressures can be maintained in the tube on each side of said sealing element, said first tube-advancing means advancing the tube at a speed $V_1$ through the calibrator and vacuum tank, a heating chamber arranged after the calibrator and vacuum tank for heating the tube to the stretching temperature, and second tube-advancing means arranged after the heating chamber for advancing the tube at a speed $V_2$, wherein $V_2 > V_1$ so that the tube is stretched in the heating chamber.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
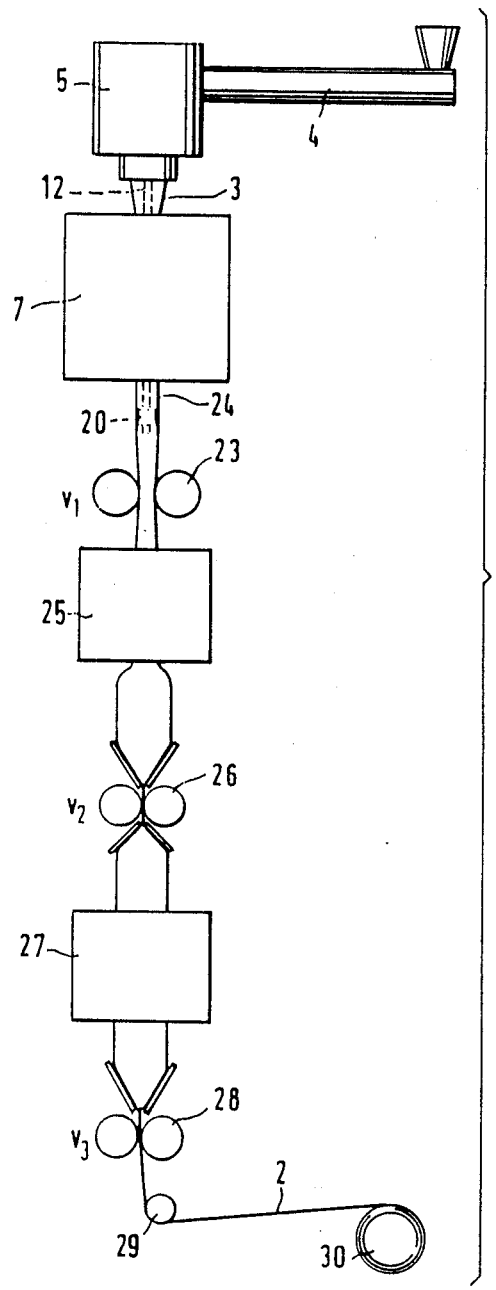
FIG. 1 shows the individual units of an apparatus for the vertical outer calibration of a tube.

According to one embodiment of the invention a parison is guided from an annular die of an extruder horizontally through a calibrator and a vacuum zone, and a tube is produced from the parison by means of vacuum calibration. A pressure $p_{i1}$ equal to atmospheric pressure $p_{atm}$ prevails inside the tube and a negative pressure $p_{a1}$ lower than atmospheric pressure prevails on the outside of the tube in the vacuum zone. Inside the tube a pressure separation is performed at the beginning of stretching in such a way that, after the zone of pressure separation, the inside of the tube remote from the die is subjected to a pressure $p_{i2}$ greater than atmospheric pressure and the tube is heated to the stretching temperature $T_{ST}$ and is stretched at a stretching speed $v_2$, increased relative to the take-off speed $v_1$ of the parison, to form the tube.

Another variant of the process is defined in which a parison is led from an annular die of an extruder vertically through a calibrator and a vacuum zone. The parison is wetted with water on the outside at the upper discharge end of the calibrator. In the vacuum zone, a pressure $p_{i1}$ equal to atmospheric pressure $p_{atm}$ prevails inside the tube formed from the parison and a negative pressure $p_{a1}$ lower than atmospheric pressure prevails on the outside of the tube. The tube is cooled underneath the vacuum zone, and a pressure separation is performed inside the tube at the beginning of stretching in such a way that, underneath the pressure separation, the inside of the tube is subjected to a pressure $p_{i2}$ greater than atmospheric pressure. The tube is heated to the stretching temperature $T_{ST}$ and is stretched at a stretching speed $v_2$, increased relative to the take-off speed $v_1$ of the parison, to form the tube.

An apparatus for the production of an extruded, stretched, seamless tube from partially crystalline polymers, which is continuously calibrated on the outside in one operation, has an annular die, a calibrator and a vacuum tank. A probe pipe runs inside a parison from the annular die through the calibrator and the vacuum tank almost up to a first belt take-off. Close to the end remote from the die of the probe pipe, a sealing element for the pressure separation inside the parison shaped into a tube is mounted on the outside of the probe pipe and bears in a sealing manner against the inside of the tube. A gas flows through the probe pipe into the tube and exerts on the latter, after the sealing element, a pressure $p_{i2}$ higher than atmospheric pressure. A first heating chamber for heating to the stretching temperature $T_{ST}$, a second belt takeoff, a second heating chamber for the heat setting of the tube and a third belt take-off are arranged downstream of the first belt take-off. The tube folded by the third belt take-off can be sent via a deflection roller to a wind-up roller.

According to the invention, parisons calibrated on the outside of diameters from 4 to 40 mm, which can be stretched into tubes of diameters from 12 to approximately 170 mm, can be produced continuously. The starting material is a polymer having a high tendency to crystallize, a low melt viscosity and/or a low tensile strength of melt at working temperature.

FIG. 1 shows the essential stations or units of apparatus 1 for the vertical outer calibration of a tube. Apparatus comprises extruder 4, which charges annular die 5 with partially crystalline polymer, from which single-layered or multi-layered tubes, which are used for example as sausage skins, are extruded. From annular die 5, parison 3 enters vertically downward into calibrator 7, which is partially surrounded by a vacuum tank. Inside parison 3 there extends probe pipe 12, which bears close to its lower end sealing element 20, which separates in terms of pressure the upper part of tube 24, which is produced from parison 3 by the calibration, from the lower tube part. After passing sealing element 20, tube 24 is transported further by first belt take-off 23 and runs through a first heating chamber 25, in which there is, for example, a heating device in the form of an annular IR radiator, through the inside diameter of which the tube passes. First belt take-off 23 draws tube 24 off, for example, at a take-off speed $v_1$. After first heating chamber 25, the tube inflates due to the air expanding inside it and is transported by second belt take-off 26 at a stretching speed $v_2$. Since stretching speed $v_2$ is higher than takeoff speed $v_1$, a longitudinal stretching of the tube takes place. Following this, the tube passes into second heating chamber 27, which is constructed similarly to heating chamber 25, and in which a heat setting of the tube material is performed. Third belt take-off 28 folds and transports heat-set tube 2 at a speed $v_3$ via deflection roller 29 to wind-up roller 30.

The vertical outer calibration of parison 3 is described below with reference to the longitudinal section through calibrator 7 and vacuum tank 16 in FIG. 2. Parison 3 passes, in extruded and seamless form, out of gap 37 (FIG. 5) between helix distributor or torpedo 6 and annular die 5 into calibrator 7. Calibrator 7 consists of perforated calibrator bush 8 and feed section 9, which has conical feed funnel 10. Feed section 9 has annular cavity 13, with inflow and outflow 14 and 15, respectively, for a cooling medium, which is generally water. From outflow 15, connected to cavity 13, a bypass line branches off to annular gap 11 in feed section 9. Through annular gap 11, a partial flow of cooling water is discharged as lubricating water into the space between parison 3 and the inside wall of calibrator bush 8. The melt of parison 3, coming from annular die 5, is shaped in the first shaping by calibrator 7 to form tube 24.

Perforated calibrator bush 8 is arranged in vacuum tank 16, in which a negative pressure $p_{a1}$ prevails, which bears on the outside against calibrator bush 8, so that air and the lubricating water on the outside of tube 24 are sucked off through the perforations through vacuum tank 16. The air-flows through the perforations are indicated in FIG. 2 by arrows. The negative pressure $p_{a1}$ has a pressure difference relative to atmospheric pressure $p_{atm}$ in the region of 50 to 300 mbar, depending on how great the suction capacity is of the pump which is connected to vacuum tank 16. Due to the negative pressure $p_{a1}$ bearing on the outside of calibrator bush 8, parison 3 is shaped into tube 24, which bears against the inside of perforated calibrator bush 8, and can be drawn off without problems, due to the lubricating water film between the inside of calibrator bush 8 and the outside of tube 24. Moreover, the vacuum in vacuum tank 16 prevents cooling or lubricating water escaping from calibrator 7 and being able to penetrate into the downstream first heating chamber in the infra-red heating zone in the event of a breaking-off of tube 24.

The further cooling of tube 24 takes place by double-walled cooler 33, which has inlet 34 and outlet 35 for the coolant, which is generally water. In cooler 33, the cooling water flows through the space between the cooler walls, but does not come into direct contact with tube 24, which is drawn off coaxially to probe pipe 12, the inside o tube 24 running at a distance from outside 17 of probe pipe 12.

Cooler 33 adjoins discharge orifice plate 40, underneath which horizontally displaceable cutting/slitting device 36 for parison 3 is arranged. After running satisfactorily into the stretching zone, parison 3 is cut open by means of cutting/slitting device 36 in order to screw a sealing element onto probe pipe 12.

The material of calibrator 7 is a metal, such as for example brass, the calibrator being designed such that, after exchanging calibrator bush 8 and cooler 33, parisons of 4 to 40 mm diameter can be produced, which can then be stretched into tubes up to 170 mm caliber.

Figure 2:
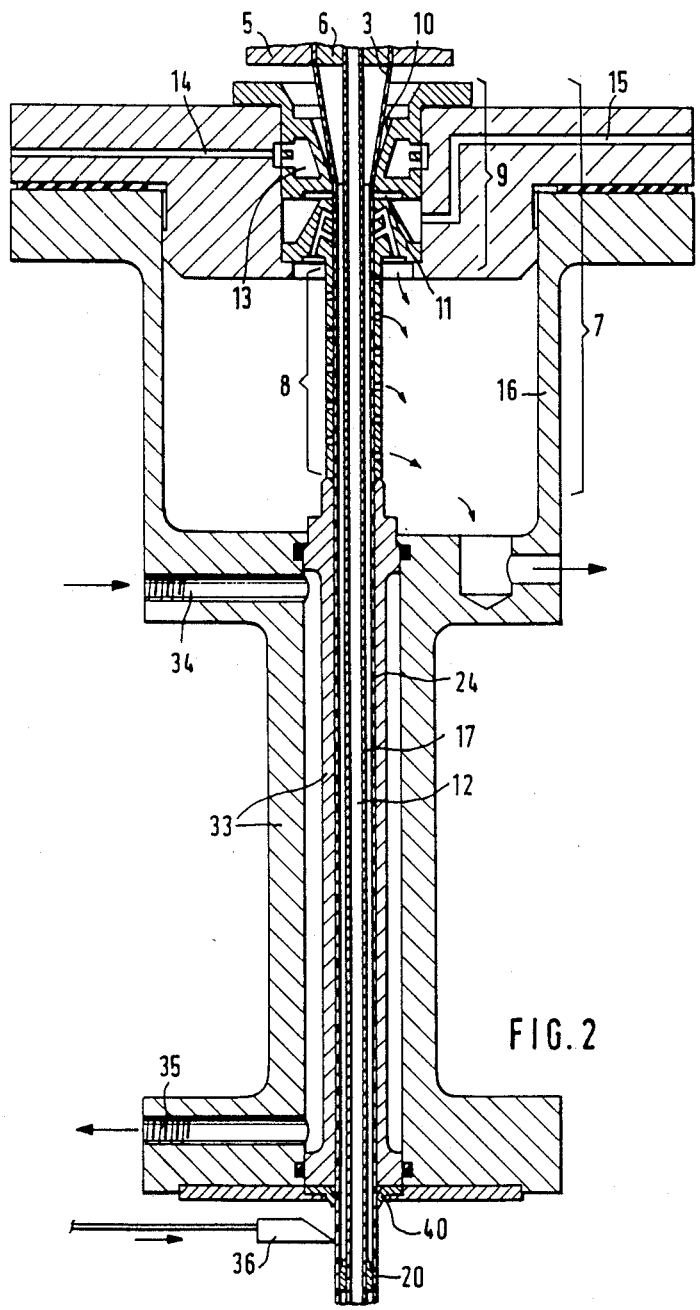
FIG. 2 is a longitudinal section through a calibrator and a vacuum tank of the apparatus.
Figure 3:
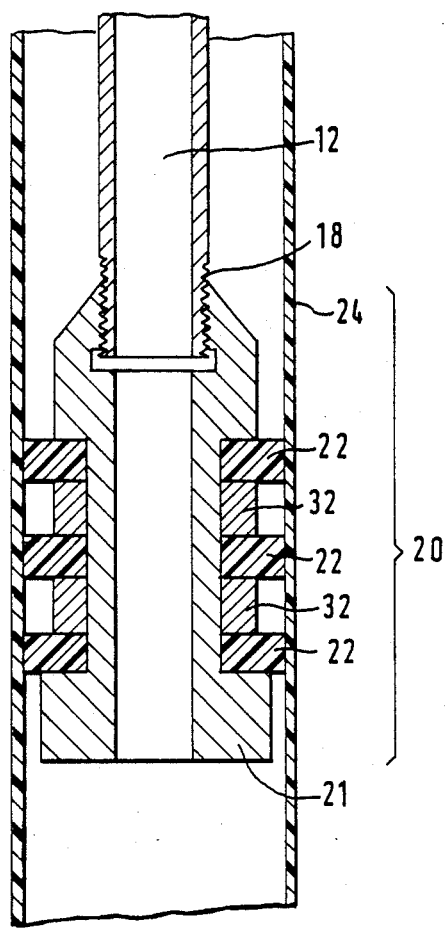
FIG. 3 is a longitudinal section of a sealing element of the apparatus for pressure separation inside the tube at the beginning of tube stretching.

FIG. 3 shows in detail the section through sealing element 20 of the apparatus according to FIGS. 1 and 2. Sealing element 20 is screwed on close to the end remote from the die of probe pipe 12, which has external thread 18 on outside 17, and serves for the pressure separation inside tube 24. Sealing element 20 consists of sealing member 21, which is in engagement with external thread 18 of probe pipe 12. In sealing member 21 there are inserted mutually coaxially aligned sealing washers 22, which are separated from one another by spacer rings 32 and bear against the inside of tube 24 as sealing lips and thus separate from each other, in terms of pressure, the spaces above and below sealing washers 22.

Sealing element 20 can be arranged on probe pipe 12 within a region which extends from the lower wall of vacuum tank 16 up to the end remote from the die of probe pipe 12, which is close to first belt take-off 23.

Through probe pipe 12, through which annular die 5 is passed, there flows a gas, generally air, into tube 24 and exerts on the latter, underneath sealing element 20, a pressure $p_{i2}$ higher than atmospheric pressure. Inside the pipe, above sealing element 20, there prevails a pressure $p_{i1}$ equal to atmospheric pressure, while on the outside of the pipe, in vacuum tank 16, as already mentioned above, there is a negative pressure $p_{a1}$ lower than atmospheric pressure.

Sealing element 20 is placed on probe pipe 12 at a point at which a plastic deformation of the plastic material of tube 24 no longer takes place.

Figure 4:
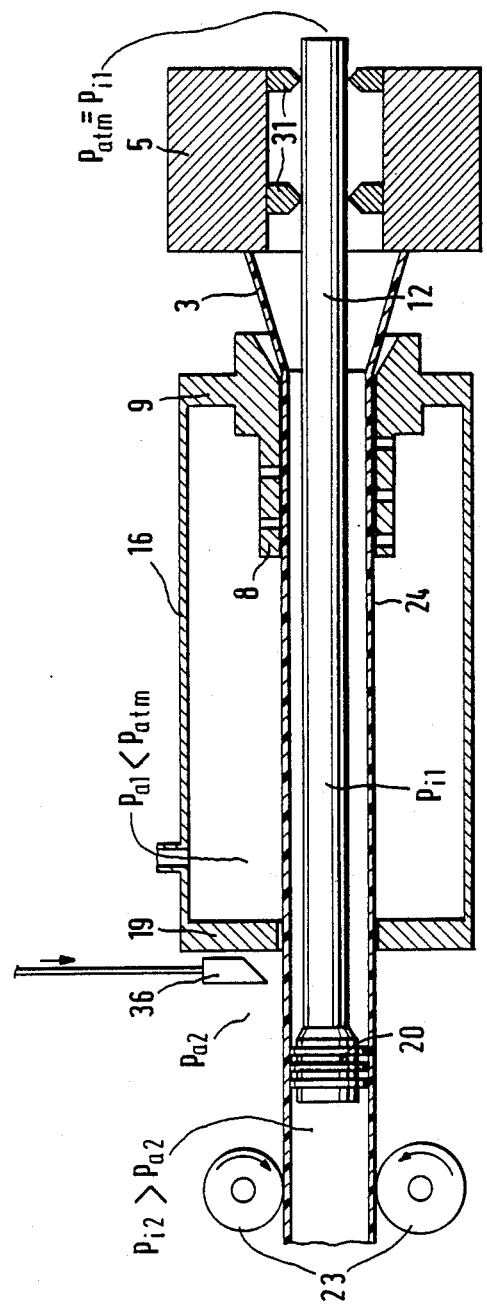
FIG. 4 is a longitudinal section of an annular die, a calibrator and a sealing element of an apparatus for the horizontal outer calibration of a tube.

In FIG. 4, annular die 5, calibrator bush 8, feed section 9, vacuum tank 16 and sealing element 20 of an apparatus for the horizontal outer calibration of a tube are shown in a longitudinal section. Probe pipe 12 is mounted horizontally in probe guide 31 inside annular die 5, and parison 3, or tube 24 produced from parison 3 by the outer calibration, run coaxially to probe pipe 12, which is made to extend out of vacuum tank or vacuum chamber 16 almost up to first belt takeoff 23. In the take-off direction of tube 24 there is, after discharge orifice plate 19 of vacuum tank 16, vertical cutting/slitting device 36, which is displaceable with respect to the axis of tube 24 and with the aid of which the tube 24 or the parison can be cut open, in order to be able to screw sealing element 20 onto the external thread of probe pipe 12.

Just as in the vertical outer calibration of the tube, it is also true for the horizontal outer calibration that a pressure $p_{i1}$ equal to atmospheric pressure $p_{atm}$ prevails inside tube 24 ahead of sealing element 20, while after sealing element 20 there is inside the pipe a pressure $p_{i2}$ greater than atmospheric pressure. In order to achieve the pressure separation inside the pipe ahead of and after sealing element 20, the following procedure is adopted. First of all, parison 3 is transported from annular die 5 through vacuum tank 16 up to first belt take-off 23, which may be arranged, for example, in a way not shown, similarly to pinch rolls, for flattening of the tube. As soon as parison 3 is running satisfactorily, probe pipe 12 is pushed through the bore of annular die 5 up to the end of vacuum tank 16. After leaving vacuum tank 16, parison 3 is slit open by means of cutting/slitting device 36 and sealing element 20 is introduced into the opened tube and screwed onto the external thread of probe pipe 12. Probe pipe 12 can then be pushed forward a little more beyond the end of the vacuum tank. Due to the sealing element, parison 3, or tube 24, is closed off and ready for further processing. The position of the sealing element may be adjusted by displacing the end of probe pipe 12 up to discharge orifice plate 19 of vacuum tank 16. As soon as tube 24 is closed by second belt take-off 26 or by pinch rolls (not shown) for flattening tube 24, the inside of tube 24, after sealing element 20, is subjected to a pressure of up to 2 bar through probe pipe 12, as a result of which the subsequent stretching of tube 24 is initiated.

Figure 5:
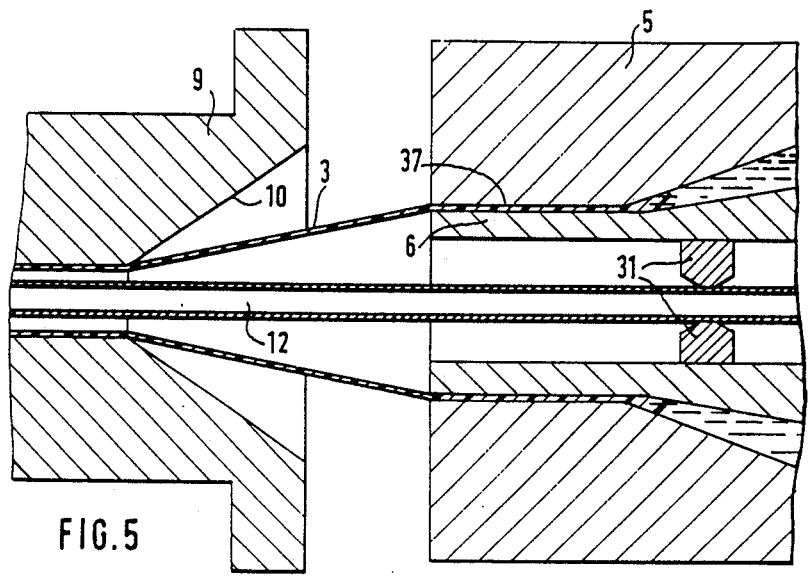
FIG. 5 is an enlarged longitudinal section of the transfer of a parison from the annular die to the calibrator of the apparatus according to FIG. 4.

FIG. 5 shows an enlargement of annular die 5 and feed section 9 of the calibrator of the apparatus according to FIG. 4. In annular die 5 there is a conically converging channel, which is filled with the plastic melt from the extruder. The channel goes over into gap 37, which runs parallel to probe pipe 12, has a gap width between 0.6 and 0.9 mm and conforms substantially to the requirements made on the parison 3. Out of gap 37 exudes extruded, seamless parison 3 and passes into feed funnel 10 of feed section 9, the diameter of parison 3 being reduced relative to the diameter of the extrudate from gap 37. Parison 3 may be formed of one or more layers. The production of a single-layered parison takes place by means of a helix distributor, while a torpedo is additionally employed for a multilayered parison.

Figure 6:
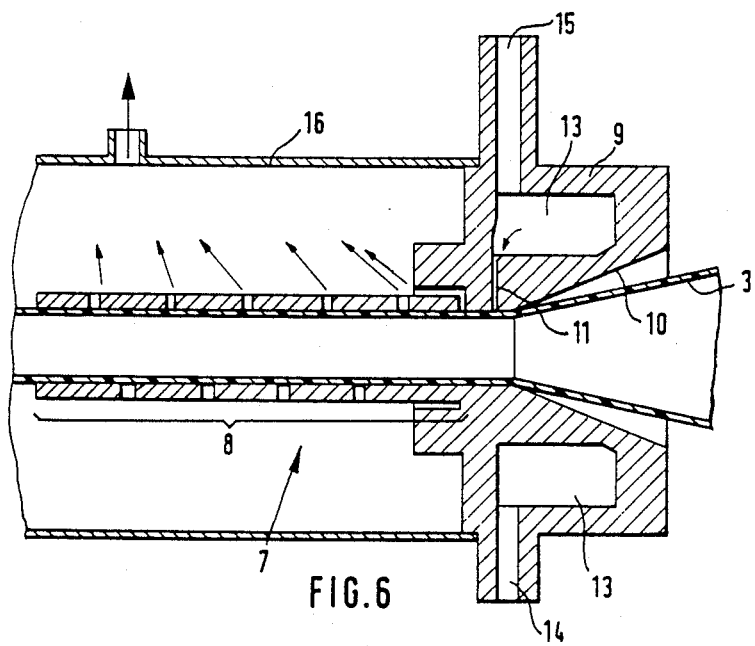
FIG. 6 is a detailed cutout of the calibrator according to FIG. 4.

FIG. 6 shows a detailed cutout of calibrator 7 of the apparatus according to FIG. 4. The point at which parison 3 comes into contact for the first time with feed funnel 10 of feed section 9 must be well cooled, but must not be covered by a lubricating water film. Cavity 13 of feed section 9 is cooled via inlet 14 by coolant, in particular cooling water, which flows out again from outlet 15. Annular gap 11, which leads to the surface of feed section 9, is connected to cavity 13 on the side of outlet 15. Cooling water passes via the adjustable annular gap of 0.05 to 0.3 mm gap height as lubricant water film between the inside of calibrator bush 8 and the outside of parison 3. Annular gap 11 is set empirically during operation to its optimum gap height or gap width. Vacuum chamber 16 surrounds perforated calibrator bush 8, against which negative pressure $P_{a1}$ bears on the outside.

Figure 7:
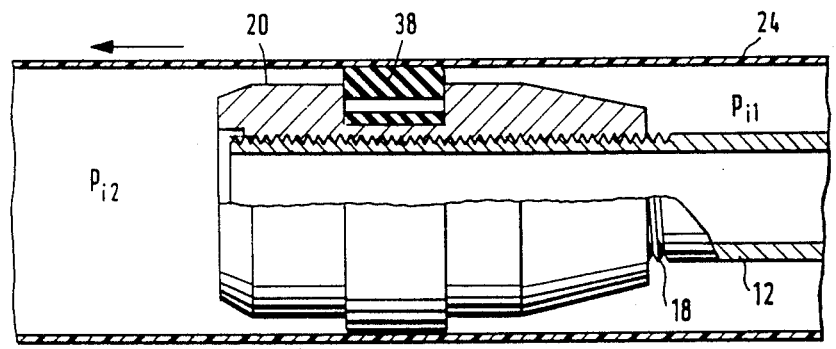
FIG. 7 shows the sealing element of the apparatus according to FIG. 4 in section.

In FIG. 7, sealing element 20 is represented which, differing from the sealing element according to FIG. 3, has instead of sealing plates a single flexible sealing lip 38, which is fitted into sealing element 20 and bears in a sealing manner against the inside of tube 24. Sealing element 20 is screwed onto external thread 18 of probe pipe 12. The internal pressure in the tube 24 ahead of flexible sealing lip 38 is equivalent to atmospheric pressure, while the internal pressure $p_{i2}$ after the flexible sealing element is chosen, for example, 1.5 bar higher than atmospheric pressure The increase in the internal pressure $p_{i2}$ is performed in the same way as already described above.

Figure 8:
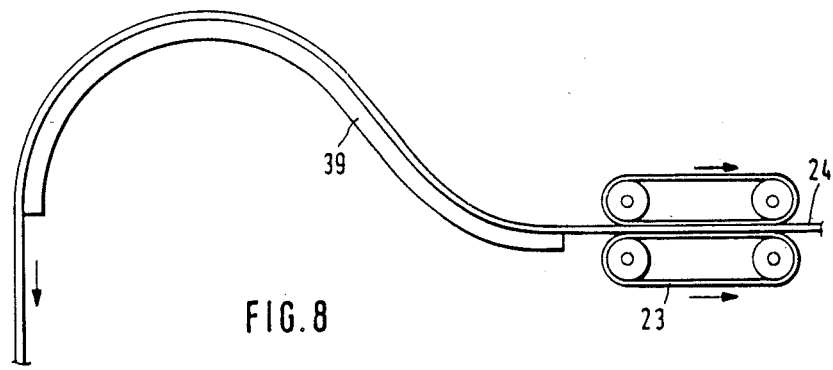
FIG. 8 shows the deflection of a tube after horizontal outer calibration into the vertical to the stretching part of the apparatus.

In FIG. 8, the connection between the horizontal production of the parison, or of pipe 24, as shown in FIG. 4, and the vertical stretching of tube 24 into the final tube is shown. In the link-up of parison production and stretching, a deflection of the parison and a tension separation is necessary. The tension separation must be interposed between the formation of tube 24 and the first stretching stage of the apparatus, as otherwise the parison would be drawn out of the annular die during the flattening of tube 24 in first belt take-off 23. Belt take-off 23 consists here of two counter-circulating endless belts, which are in each case led over two rollers. The belt take-off 23 transports tube 24 under the internal pressure $p_{i2}$ onward free from slip and without damaging deformations. The stretching zone works in vertical direction and is constructed analogously to the stretching region from first heating chamber 25 in FIG. 1. For the transfer from the horizontal outer calibration of tube 24 to the vertical stretching direction, deflection part 39 is provided, which is designed similarly to a swan neck and serves as a guide for tube 24 in the direction of the first heating chamber 25. Instead of deflection part 39, a circular quadrant guide may also be provided, which is not shown in detail. Such a guide generally has a bending radius of more than 600 mm for a parison or tube 24 having a caliber of 13 mm.

In the stretching zone, tube 24 is heated to the stretching temperature $T_{ST}$. This takes place in first heating chamber 25 according to FIG. 1. Second belt take-off 26, after first heating chamber 25, runs at stretching speed $v_2$, which is increased relative to the take-off speed $v_1$, and is set such that a material-dependent area factor $\lambda_F$ for stretching in the range of about 2 to 24, in particular about 4 to 12, is achieved. Third belt take-off 28 in FIG. 1 runs at slightly higher speed $v_3$ than the stretching speed $v_2$.

What is claimed is:

1. A process for the production of a stretched, seamless tube which is continuously calibrated on the outside in one operation, comprising the steps of:
   feeding an annular parison of a partially crystalline polymer into a calibrator having a vacuum zone;
   producing a calibrated tube from the parison by means of vacuum calibration in which a pressure $p_{i1}$ equal to atmospheric pressure $p_{atm}$ prevails inside the tube and a negative pressure $p_{a1}$ of from about 50 to 300 mbar lower than atmospheric pressure prevails on the outside of the tube in the vacuum zone;
   transporting the tube at a speed $V_1$ from the calibrator;
   separating and maintaining different pressures inside the tube on each side of the beginning of a stretching section by subjecting the inside of the tube downstream from the beginning of the stretching section to a pressure $p_{i2}$ set from about 0.4 to 2.0 bar higher than atmospheric pressure;
   heating the tube in a heating zone to stretching temperature $T_{ST}$; and
   transporting the tube at a speed $V_2$ from the heating zone, wherein $V_2 > V_1$ so that the tube is stretched.

2. A process according to claim 1, wherein the parison is passed horizontally through the calibrator.

3. A process according to claim 1, wherein the parison is wetted on the outside by a partial flow of cooling water from the feed section of the calibrator and passed vertically through the calibrator.

4. A process according to claim 3, further comprising the step of cooling the tube beneath the vacuum zone.

5. A process as claimed in claim 1, wherein the separation of the pressures takes place in the inside of the tube, at a point which is subjected to pressure $p_{i2}$ and at which a plastic deformation of the tube no longer takes place.

6. A process as claimed in claim 1, wherein the stretching speed $v_2$ is set such that a material-dependent area factor $\lambda_F$ for stretching is in the range of about 2 to 24.

7. A process according to claim 1, wherein the stretching speed $V_2$ is set such that a material-dependent area factor $\lambda_F$ for stretching is in the range of about 4 to 12.

8. A process as claimed in claim 1, wherein the outside diameter of the tube is up to 170 mm.

9. Apparatus for the production of an extruded, stretched, seamless tube from a partially crystalline polymer, which is continuously calibrated on the outside in one operation, comprising:
   an annular die for producing a parison;
   a calibrator and vacuum tank arranged after the annular die for producing a tube from the parison by vacuum calibration;
   a probe pipe with gas-flowing means running through the calibrator and vacuum tank almost up to a first tube-advancing means;
   a sealing element on a portion of the probe pipe after the calibrator so that different pressures can be maintained in the tube on each side of said sealing element, atmospheric pressure being maintained upstream and a pressure higher than atmospheric being maintained downstream;
   said first tube-advancing means advancing the tube at a speed $V_1$ through the calibrator and vacuum tank;
   a heating chamber arranged after the calibrator and vacuum tank for heating the tube to a stretching temperature; and
   second tube-advancing means arranged after the heating chamber for advancing the tube at a speed $V_2$, wherein $V_2 > V_1$, so that the tube is stretched in said heating chamber.

10. An apparatus as claimed in claim 9, wherein the probe pipe is mounted in a probe guide inside the annular die and has at the end remote from the die an external thread, onto which the sealing element is screwed, said sealing element comprising a sealing member with mutually coaxial sealing washers separated by spacer rings, wherein the sealing washers bear against the inside of the tube as sealing lips.

11. An apparatus as claimed in claim 9, wherein the calibrator comprises a perforated calibrator bush and a feed section with conical feed funnel, wherein the feed section has at the end adjoining the calibrator bush an annular gap, through which a partial flow of cooling water is discharged as lubricating water into the space between the parison and the calibrator bush.

12. An apparatus as claimed in claim 11, wherein the feed section has an annular cavity with an inlet and outlet for cooling water, and wherein the annular gap is connected to this cavity.

13. An apparatus as claimed in claim 11, wherein the adjustable annular gap has a gap height between about 0.05 and 0.3 mm, and wherein the perforated calibrator bush is arranged in the vacuum tank and on the outside bears against a negative pressure $p_{a1}$.

14. An apparatus as claimed in claim 13, wherein the sealing element is arranged on the probe pipe within a region from a discharge orifice plate of the vacuum tank almost up to the first tube-advancing means.

15. An apparatus as claimed in claim 9, wherein the probe pipe is arranged vertically and, outside the vacuum tank, passes through a double-walled cooler which has an inlet and outlet for transporting cooling water into and out of a space between the cooler walls.

16. An apparatus as claimed in claim 9, wherein the probe pipe is arranged horizontally and, after the vacuum tank, a vertically displaceable slitting device for the tube is arranged.

17. An apparatus as claimed in claim 9, wherein, at the end remote from the die of the probe pipe, a sealing element is screwed onto an external thread, and wherein a single sealing lip, which bears in a sealing manner against the inside of the tube, is fitted into the sealing element.

18. An apparatus as claimed in claim 15, wherein, after the cooler, a horizontally displaceable slitting device for the tube is arranged.

19. An apparatus as claimed in claim 9, additionally comprising a second tube-advancing means located after said first heat chamber and a second heat chamber for heat setting said tube.

20. An apparatus as claimed in claim 19, additionally comprising a third tube-advancing means which folds said tube and transports the folded tube via a deflection roller to a wind-up roller.

* * * * *